(12) United States Patent
Chiu et al.

(10) Patent No.: US 6,214,158 B1
(45) Date of Patent: Apr. 10, 2001

(54) HIGH TEMPERATURE CARBONACEOUS CEMENT

(75) Inventors: Charles Chi-Chieh Chiu; Irwin Charles Lewis; Richard Thomas Lewis, all of Strongsville, OH (US)

(73) Assignee: UCAR Carbon Company Inc., Nashville, TN (US)

( * ) Notice: Subject to any disclaimer, the term of this patent is extended or adjusted under 35 U.S.C. 154(b) by 0 days.

(21) Appl. No.: 09/258,517

(22) Filed: Feb. 26, 1999

(51) Int. Cl.[7] ....................................................... C09J 5/04

(52) U.S. Cl. ................ 156/314; 106/287.24; 156/331.1; 252/510; 528/351; 528/405

(58) Field of Search .................. 156/3.4, 331.1; 252/510; 106/287.24; 528/351, 405

(56) References Cited

U.S. PATENT DOCUMENTS

| | | | | |
|---|---|---|---|---|
| 2,692,205 | * | 10/1954 | Grieder et al. ....................... | 252/510 |
| 3,187,089 | * | 6/1965 | Cosby et al. ......................... | 252/510 |
| 3,511,733 | * | 5/1970 | Fincke et al. ........................ | 528/351 |
| 5,002,981 | * | 3/1991 | Chiu ..................................... | 523/141 |
| 5,972,157 | * | 10/1999 | Xue et al. ............................ | 156/182 |

* cited by examiner

Primary Examiner—John J. Gallagher
(74) Attorney, Agent, or Firm—Delio & Peterson, LLC

(57) ABSTRACT

A curable, high temperature, carbonaceous, cement paste composition comprising a catalyst; a carbon filler present in an amount of about 20 to about 60 wt. %; a polymerizable monomeric system present in an amount of about 7 to about 30 wt. % comprising a dialkyl ester of an aromatic tetracarboxylic acid, an aromatic diamine, and a monoalkyl ester of an acid selected from the group consisting of 5-norbornene-2,3-dicarboxylic acid and phthalic acid; and a furan solvent present in an amount of about 20 to about 60 wt. %. The most preferred embodiment comprising a monomeric system comprising a dimethyl ester of 3,3',4,4'-benzophenonetetracarboxylic acid, 2,2'-bis (4-[4-aminophenoxyl]phenyl)propane and a monomethyl ester of 5-norbornene-2,3-dicarboxylic acid with furfuryl alcohol and a catalytic solution of about 50% $ZnCl_2$, has a glass transition temperature of about 280° C. after curing by heating at about 2° C./minute to about 240° C. and holding for about 2 hours. Upon curing, the cement paste composition maintains a strength of at least about 2000 psi at room temperature after heat treatment at about 3000° C. even when cured at a substantially lower temperature of at least about 200° C. Subsequent heating of the monomeric binder causes further cross-linking producing a stronger and more stable cement for use at service temperatures greater than the initial glass transition temperature of the cured cement. The curable cement composition may be used along with a pre-coat in an adhesive system for attaching together carbon bodies. Most preferably, the pre-coat comprises about 27 wt. %, of a monomeric system comprising a dimethyl ester of 3,3',4,4'-benzophenonetetracarboxylic acid, 2,2'-bis (4-[4-aminophenoxyl]phenyl)propane and a monomethyl ester of 5-norbornene-2,3-dicarboxylic acid dissolved in about 65 to about 85 wt. % furfuryl alcohol. A method of making the cement paste composition is also described.

24 Claims, 2 Drawing Sheets

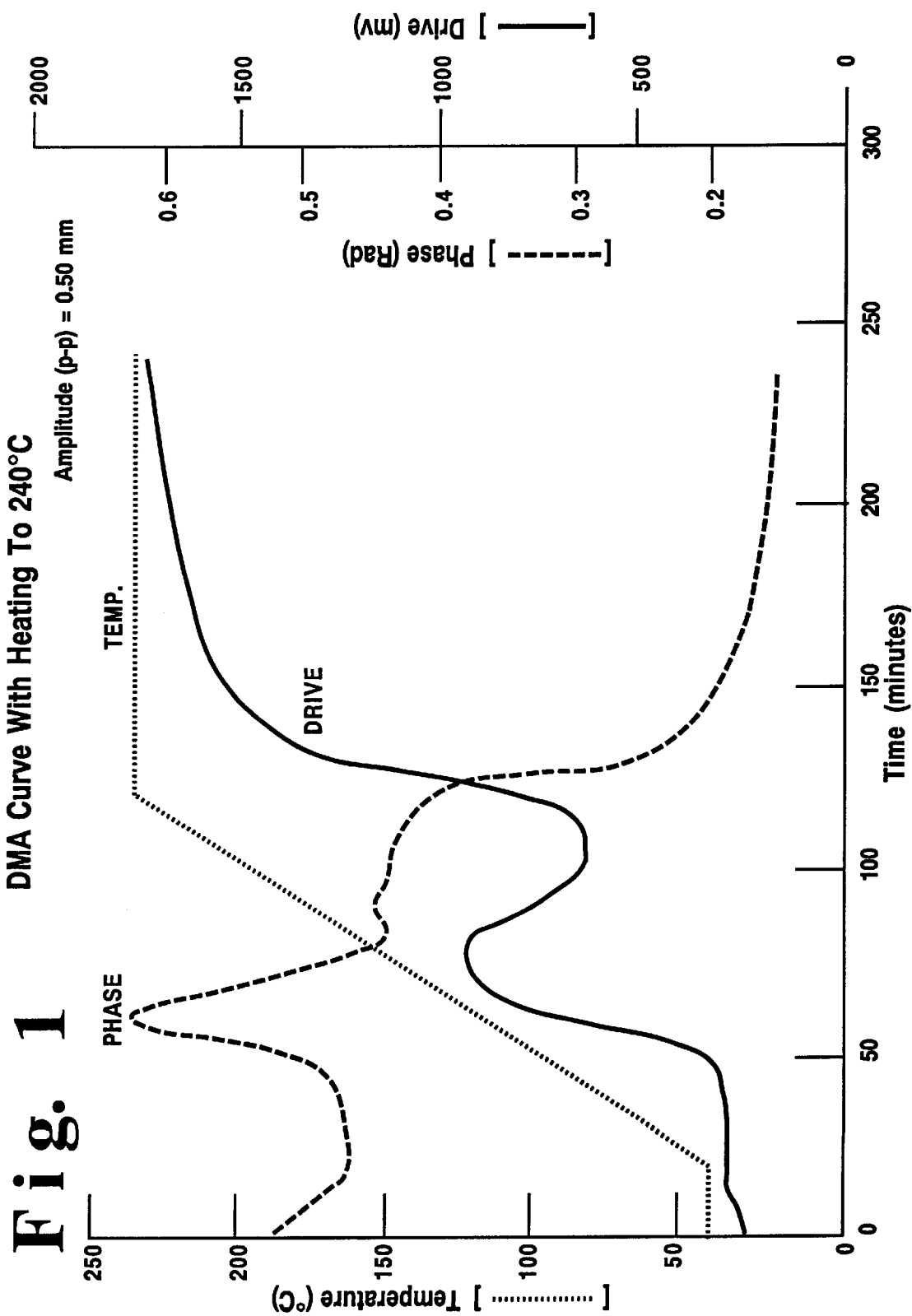

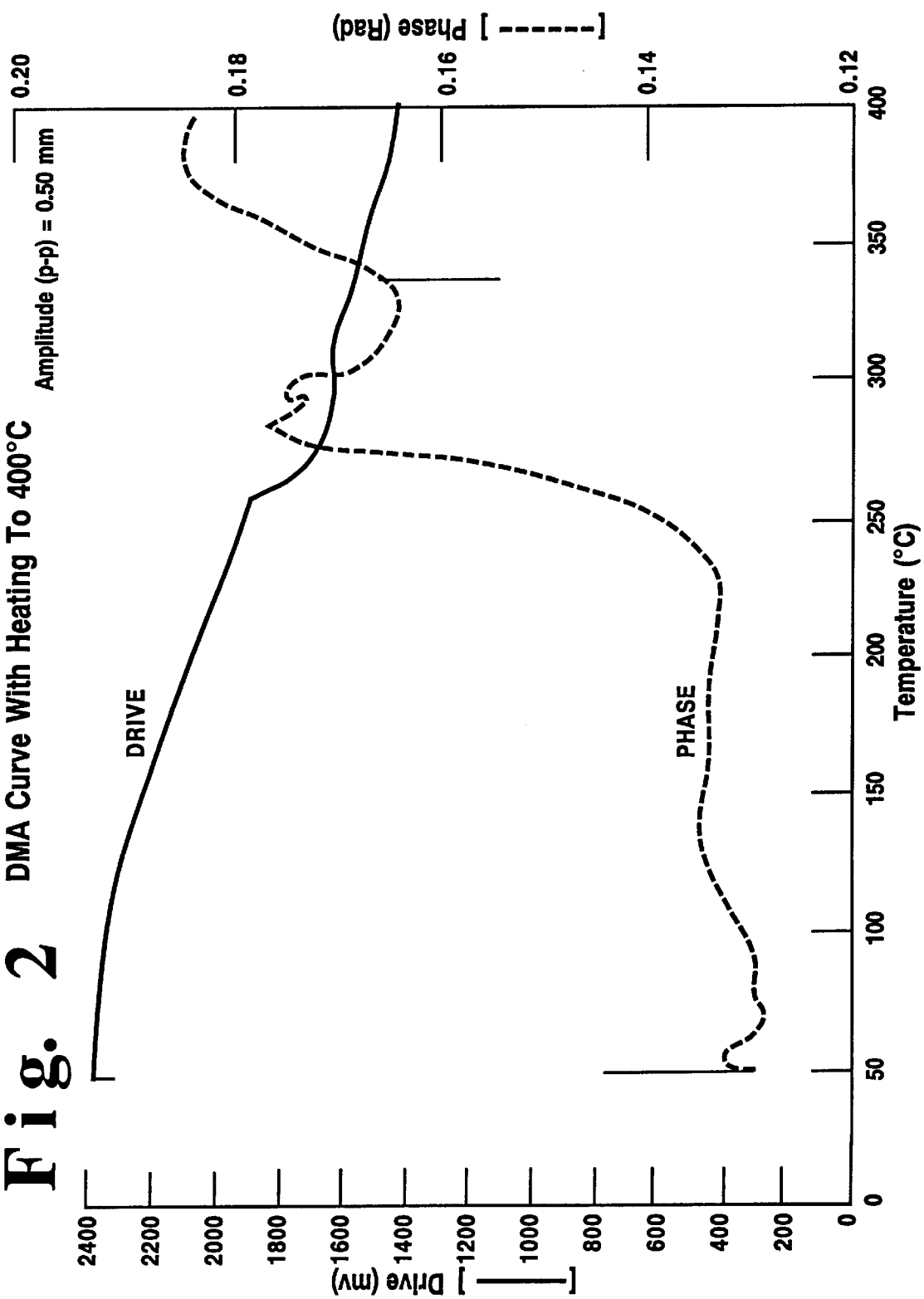

HIGH TEMPERATURE CARBONACEOUS CEMENT

BACKGROUND OF THE INVENTION

1. Field of the Invention

This invention is directed to a high temperature carbonaceous cement for bonding large carbon bodies which is curable at a low temperature while being capable of retaining strength and stability at extremely high temperatures.

2. Description of Related Art

Large machined graphite shapes have many uses and may be subject to extreme temperature conditions and/or thermal cycling. For example, in the aerospace industry graphite is used in large molds for the production of composite structures. Such large shapes, due to their sheer size, are made from smaller parts and assembled together. The assembly of the graphite shapes requires carbonaceous bonding agents which must withstand extreme temperatures and thermal cycling while retaining the strength of the joint. The strength of the joints between the individual graphite shapes should be sufficient to avoid failure of the mold.

An example of a conventional carbonaceous cement is disclosed in U.S. Pat. No. 5,002,981 ('981 patent) to Chiu and is assigned to the assignee of the current invention. The cement of the '981 patent is made from a binder comprising a pre-imidized oligomeric precursor which polymerizes at the acetylenic end-caps of the molecule. Dynamic Mechanical Analysis (DMA) of the binder phase of the '981 patent after curing at 240° C. for 2 hours shows a glass transition temperature of 274° C. It also partially softens when heated above the 240° C. cure temperature indicating that it had not completely gelled. Gelation of the binder occurs when it will no longer melt when heated above the initial cure temperature. Gelation indicates further cross-linking of the binder phase producing a stronger binder, thus a stronger cement. Thus, it is desirable to provide a carbonaceous cement for use at high service temperatures which is more completely gelled during its initial cure and substantially gels with less softening during subsequent heating.

Bearing in mind the problems and deficiencies of the prior art, it is therefore an object of the present invention to provide a carbonaceous cement having superior strength and stability at high service temperatures.

It is another object of the present invention to provide a carbonaceous cement having a low curing temperature while retaining its strength at high service temperatures.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a curable cement paste composition comprising a catalyst; a carbon filler present in an amount of about 20 to about 60 wt. %; a polymerizable monomeric system present in an amount of about 7 to about 30 wt. % comprising a dialkyl ester of an aromatic tetracarboxylic acid, an aromatic diamine, and a monoalkyl ester of an acid selected from the group consisting of 5-norbornene-2,3-dicarboxylic acid and phthalic acid; and a furan solvent present in an amount of about 20 to about 60 wt. %.

Preferably, the dialkyl ester of an aromatic tetracarboxylic acid comprises a dimethylester of 3,3',4,4'-benzophenonetetracarboxylic acid, the aromatic diamine is selected from the group consisting of 4,4'-methylenedianiline, 4,4'-oxydianiline, ρphenylenediamine, 2,2'-bis(4-[4-aminophenoxyl]phenyl)propane, and 3,5-diaminobenzotrifluoride, and the monoalkyl ester comprises a monomethyl ester of 5-norbornene-2,3-dicarboxylic acid.

The preferred embodiment of the cement paste composition upon curing maintains a strength of at least about 2000 psi at room temperature after heat treatment at about 3000° C. even when cured at a substantially lower temperature of at least about 200° C.

The present invention is directed to, in another aspect, a carbonaceous bonding composition comprising an effective amount of furfuryl alcohol; a carbon filler comprising pitch coke flour, petroleum coke flour, carbon black or mixtures thereof; a polymerizable monomeric binder comprising a dimethylester of 3,3',4,4'-benzophenonetetracarboxylic acid, 2,2'-bis(4-[4-aminophenoxyl]phenyl)propane and a monomethyl ester of 5-norbornene-2,3-dicarboxylic acid, the monomeric binder dissolved in an effective amount of furfuryl alcohol and admixed with the carbon filler to a uniform consistency; and a catalytic solution comprising an aqueous solution of zinc chloride admixed with furfuryl alcohol, the catalytic solution added to the monomeric binder and the carbon filler. The carbonaceous bonding composition is curable at a temperature of at least about 200° C., produces a carbon yield of about 70% at about 900° C. and, preferably, maintains a strength of at least about 2000 psi at room temperature after heat treatment at about 3000° C. even when cured at a substantially lower temperature.

Preferably, the carbonaceous bonding composition comprises carbon filler present in an amount of about 40 wt. %, furfuryl alcohol present in an amount of about 41 wt. %, and polymerizable monomeric system present in an amount of about 15 wt. % based upon the weight of the bonding composition.

The present invention is directed to, in yet another aspect, a method of making a carbonaceous cement composition by admixing the following materials: a catalyst; a furan solvent in an amount of about 20 to about 60%; a carbon filler in an amount of about 20 to about 60 wt. %; and a polymerizable monomeric binder in an amount of about 7 to about 30 wt. % comprising a dialkyl ester of an aromatic tetracarboxylic acid, an aromatic diamine, and a monoalkyl ester of an acid selected from the group consisting of 5-norbornene-2, 3dicarboxylic acid and phthalic acid; and curing the admixture at a temperature of at least about 200° C.

The present invention is directed to, in still another aspect, a method of bonding carbon bodies comprising the steps of: (a) providing two or more carbon bodies to be bonded together; (b) coating the carbon bodies with a pre-oat at a bonding site until the bonding site is substantially saturated with the pre-coat, the pre-coat comprising a furan solvent, a polymerizable monomeric system comprising a dialkyl ester of an aromatic tetracarboxylic acid, an aromatic diamine, and a monoalkyl ester of an acid selected from the group consisting of 5-norbornene-2,3-dicarboxylic acid and phthalic acid, the monomeric system dissolved in an effective amount of the furan solvent, and a catalyst, the catalyst added to the polymerizable monomeric system dissolved in an effective amount of the furan solvent; (c) applying an effective amount of a carbonaceous cement composition to the bonding site, the carbonaceous cement composition comprising a furan solvent in an amount of about 20 to about 60 wt. %, a catalyst admixed with a first effective amount of the furan solvent, carbonaceous particles in an amount of about 20 to about 60 wt. %, and a polymerizable monomeric binder in an amount of about 7 to about 30 wt. % comprising a dialkyl ester of an aromatic tetracarboxylic acid, an aromatic diamine, and a monoalkyl ester of an acid selected from the group consisting of 5-norbornene-2,3-dicarboxylic acid and phthalic acid, the monomeric binder dissolved in a second effective amount of the furan solvent and admixed with the carbonaceous particles and the catalyst to form the cement composition; (d) setting the carbon bodies together at the bonding site forming a joined carbon body; and (e) heating the joined carbon body.

Preferably, the pre-coat comprises a monomeric system comprising a dimethylester of 3,3',4,4'-benzophenonetetracarboxylic acid, 2,2'-bis(4-[4 aminophenoxyl]phenyl)propane and a monomethyl ester of 5-norbornene-2,3-dicarboxylic acid dissolved in an effective amount of furfuryl alcohol to which is added about 50 wt. % aqueous zinc chloride solution.

Preferably the carbonaceous cement composition comprises an effective amount of furfuryl alcohol; a catalyst comprising an aqueous solution of zinc chloride admixed with a first effective amount of furfuryl alcohol; carbonaceous particles comprising petroleum coke flour, pitch coke flour, carbon or mixtures thereof; a polymerizable monomeric binder comprising a dimethylester of 3,3', 4,4'-benzophenonetetracarboxylic acid, 2,2'-bis(4-[4-aminophenoxyl]phenyl)propane and a monomethyl ester of 5-norbornene-2,3-dicarboxylic acid dissolved in an effective amount of furfuryl alcohol, the polymerizable monomeric binder admixed with the carbonaceous particles to a uniform consistency. The carbonaceous bonding composition is curable at a temperature of at least about 200° C., and, preferably, produces a carbon yield of about 70% at about 900° C. and, preferably, maintains a strength of at least about 2000 psi at room temperature after heat treatment at about 3000° C. even when cured at a substantially lower temperature.

The present invention is directed to, in a final aspect, a high temperature adhesive system comprising a pre-coat for substantially saturating a carbon body at a bonding site, the pre-coat comprising a first portion of a furan solvent, a polymerizable monomeric system comprising a dialkyl ester of an aromatic tetracarboxylic acid, an aromatic diamine, and a monoalkyl ester of an acid selected from the group consisting of 5-norbornene-2,3-dicarboxylic acid and phthalic acid, the monomeric system dissolved in an effective amount of the first portion of a furan solvent, and a catalyst added to the polymerizable monomeric system dissolved in an effective amount of the first portion of a furan solvent; and a carbonaceous cement composition for applying to the carbon body at the bonding site over the pre-coat, the carbonaceous cement composition comprising a second portion of a furan solvent; a catalyst admixed with a first effective amount of the second portion of a furan solvent; carbonaceous particles; and a polymerizable monomeric system comprising a dialkyl ester of an aromatic tetracarboxylic acid, an aromatic diamine, and a monoalkyl ester of an acid selected from the group consisting of 5 norbornene-2,3-dicarboxylic acid and phthalic acid, the monomeric system dissolved in a second effective amount of the second portion of a furan solvent and admixed with the carbonaceous particles and the catalyst to form the cement composition.

Preferably, the monomeric system of the pre-coat comprises a dimethylester of 3,3',4,4'-benzophenonetetracarboxylic acid, 2,2'-bis(4-[4 aminophenoxyl]phenyl)propane and a monomethyl ester of 5-norbornene-2,3-dicardoxylic acid dissolved in furfuryl alcohol and wherein the catalyst comprises a 50% aqueous zinc chloride solution.

Preferably, the furan soluble, polymerizable monomeric system of the carbonaceous cement composition comprises a dimethylester of 3,3',4,4'-benzophenonetetracarboxylic acid, 2,2'-bis(4-[4-aminophenoxyl]phenyl)propane and a monomethyl ester of 5-norbornene-2,3-dicarboxylic acid, the monomeric system dissolved in an effective amount of furfuryl alcohol.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a Dynamic Mechanical Analysis curve of the binder phase of the most preferred embodiment of the present invention when heating the binder phase to 240° C.

FIG. 2 is a Dynamic Mechanical Analysis curve of the binder phase of the most preferred embodiment of the present invention when further heating the cured binder phase to 400° C.

DESCRIPTION OF THE PREFERRED EMBODIMENT

The present invention is directed to a carbonaceous cement composition comprising a polymerizable furan derivative solvent, a catalyst, a carbon filler, and a thermally, polymerizable monomeric system. Unexpectedly, the carbonaceous cement of the present invention retains its strength when heated at temperatures of up to about 3000° C. even when cured at a considerably lower temperature of at least about 200° C.

The furan solvent of the invention may, preferably, be either furfuryl alcohol or furfuraldehyde. The furan solvent allows the formation of a paste-like mixture when combined with the other solid components of the cement. However, the furan solvent is unreactive and requires a catalyst to effectuate polymerization. With the use of an added catalyst, the furan solvent may also be polymerized and incorporated into the polymerized monomeric system to provide a very high strength, thermally stable composition.

The catalyst utilized in the carbonaceous cement is most suitably any catalyst which will effectuate substantial polymerization of the furan solvent. These catalysts may include mineral acids, strong organic acids, Lewis acids and acyl-halides. Co-reactive catalysts such as phthalic anhydride may also be utilized. Illustrative of the many catalysts that may be used are the following: toluene sulfonic acid, phenol sulfonic acid, acid chlorides, zinc chloride, benzene sulfonic acid, sulfonic acid salts, hydrochloric acid, phosphoric acid, maleic acid, and sulfuric acid. Preferably the catalyst comprises an aqueous solution of zinc chloride. Most preferably, the catalyst comprises about 50 wt. % aqueous zinc chloride solution in an amount which effectuates substantial polymerization of the furan solvent together with the monomeric system when heated.

The carbon filler used in the present invention comprises finely divided carbonaceous particles which may be any suitable carbon or graphite material. Suitable carbonaceous materials include graphite flour, petroleum coke flour, carbon black, pitch coke flour, calcined lampblack flour and mixtures thereof. Preferred carbon blacks are gas blacks which are made by the passage of natural gas over hot refractories. A suitable carbon black is available from Cancarb Company, Medicine Hat, Alberta, Canada, under the trademark "THERMAX®." Most preferably, the carbon filler comprises carbon black, admixed with petroleum coke flour.

The carbon filler comprises, preferably, carbonaceous particles having an average particle size of less than about 50 μm. Using a MICROTRAC™ Particle Size Analyzer, preferably, at least 90% of the particles have a particle size of less than about 74 μm. More preferably, the carbonaceous particles have a particle size wherein at least 90% of the particles are less than about 20 μm. Most preferably, the carbonaceous particles have a particle size wherein at least 95% of the particles are less than about 10 μm. The carbonaceous particles comprising the carbon filler are generally present in an amount of about 20 to about 60 wt. %, based upon the weight of the cement paste composition. Preferably, the carbonaceous particles comprise about 10 to about 20 wt. % THERMAX®, most preferably about 12.4 wt. %, and about 20 to about 40 wt. % of coke flour, most preferably about 29.0 wt. %.

The polymerizable monomeric system which makes up the binder phase of the cement comprises a dialkyl ester of an aromatic tetracarboxylic acid, an aromatic diamine, and a monoalkyl ester of an acid selected from the group consisting of 5-norbornene-2,3-dicarboxylic acid and phthalic acid. Preferably, the alkyl chains of the esters range from C1 (methyl) to C5 (pentyl). Preferably, the dialkyl ester of an aromatic tetracarboxylic acid comprises a dimethyl ester of 3,3',4,4'-benzophenonetetracarboxylic acid. Preferably, the aromatic diamine is selected from the group consisting of 4,4'-methylenedianiline, 4,4'-oxydianiline, ρ-phenylenediamine, 2,2'-bis(4-[4-aminophenoxyl]phenyl) propane, and 3,5-diaminobenzotrifluoride. Preferably, the monoalkyl ester comprises a monomethyl ester of 5-norbornene-2,3-dicarboxylic acid. The monomeric blend may be polymerized by heat alone without the use of a catalyst.

Most preferably, the polymerized monomeric system comprises a dimethyl ester of 3,3',4,4'-benzophenonetetracarboxylic acid, 2,2'-bis (4-[4 aminophenoxyl]phenyl)propane and a monomethyl ester of 5-norbornene-2,3-dicarboxylic acid. This particular monomeric system is commercially available as a methanolic solution from Maverick Corporation of Cincinnati, Ohio or Hycomp Incorporated of Cleveland, Ohio. The monomers are vacuum stripped to a powder such that the methanol is substantially removed. To prepare the cement paste composition, the monomers are re-dissolved in a sufficient quantity of a suitable furan solvent, admixed with the carbon filler to a uniform consistency. The concentration of the monomeric system in the furan solvent should be about 20 to about 50 wt. %, preferably about 25 to about 35 wt. %.

The most preferred embodiment of the binder phase in the carbonaceous cement of the present invention comprising the following monomeric system

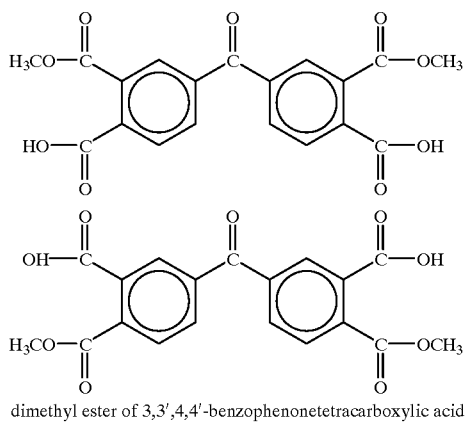

dimethyl ester of 3,3',4,4'-benzophenonetetracarboxylic acid

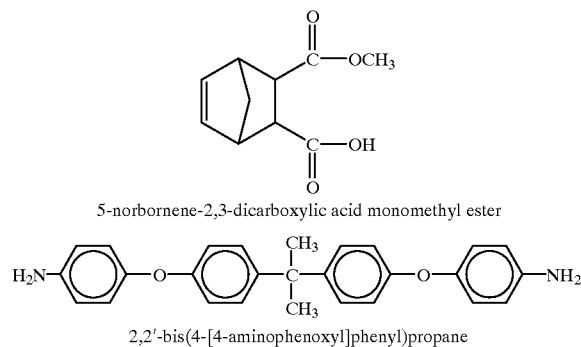

5-norbornene-2,3-dicarboxylic acid monomethyl ester 2,2'-bis(4-[4-aminophenoxyl]phenyl)propane with furfuryl alcohol and a catalytic solution of about 50% $ZnCl_2$, has a glass transition temperature of about 280° C. after curing by heating at about 2° C./minute to about 240° C. and holding for about 2 hours. The glass transition temperature reported above is measured by impregnating a stainless steel mesh of a conventional weave with the liquid binder comprising the above monomeric system, curing the binder system supported on the stainless steel mesh by heating at about 2° C./minute to about 240° C. and holding for about 2 hours in a Dynamic Mechanical Analyzer at a fixed frequency of about 1 Hz, and then re-heating the cured binder on the stainless steel mesh at about 2° C./minute up to about 400° C. The glass transition temperature is taken as the peak in the loss modulus or phase curve recorded while re-heating the supported cured binder in the DMA.

FIG. 1 shows the DMA curve when curing a binder comprising about 31.8 wt. % of the preferred monomeric system, about 63.4 wt. % furfuryl alcohol and about 4.8 wt. % of about 50% aqueous $ZnCl_2$ solution by heating at about 2° C./minute to about 240° C. and holding for about 2 hours. The temperature is shown by the dotted line. The loss modulus or phase curve, as shown by the dashed line, peaks at about 125° C. and the storage modulus or drive curve, as shown by the solid line, peaking at about 155° C., signifies partial curing of the binder phase, most likely the polymerization of the furfuryl alcohol.

FIG. 2 shows the DMA while re-heating the supported cured binder to about 400° C. at a rate of about 2° C./minute. The phase curve, shown by the dashed line, continues to increase after the cured binder reaches its glass transition temperature at about 280° C., signaling additional cross-linking and polymerization. At about 375° C. the post-cure appears to be substantially completed. Unexpectedly, the drive curve, shown by the solid line, did not decrease much when heated above the 240° C. cure temperature and remained well above the threshold value of about 250 mV representing the stainless steel mesh alone. This proves that the cured binder system did not soften significantly and that the cured binder system was substantially gelled. Therefore, the carbonaceous cement utilizing this binder may well be used at service temperatures above its curing temperature.

The cement of the invention is produced, by mixing the ingredients together by any suitable method using readily available equipment for mixing paste-like materials. The order in which the components are mixed is not critical, except that the heat-activated catalyst for the thermosetting furan should preferably be added last after mixing all the components. A separate furan mixture of the catalyst may also be added to a pre-mix of the other cement components.

A catalyst-activated, heat-curable furan solvent may be prepared by admixing at ambient temperature a major proportion of, for example, furfuryl alcohol and a minor proportion of the heat activated catalyst and water. Typically, an aqueous zinc chloride solution catalyst (about 50 wt. % $ZnCl_2$) is used in an amount of about 2 to about 10 wt. % catalyst solution, based upon the weight of furfuryl alcohol.

The carbonaceous cement composition is curable at an elevated temperature, preferably, at least about 200° C., and more preferably, from about 240° C. to about 275° C. The preferred embodiment of the carbonaceous cement composition maintains its strength at temperatures up to about 3000° C. once cured gives a carbon yield at about 900° C. of at least about 60% and preferably, at least about 70%. The carbonaceous cement composition prior to curing has a carbon filler present in an amount of about 20 to about 60 wt. %, preferably, about 40 wt. %; the furan solvent is present in an amount of about 20 to about 60 wt. %, preferably, about 40 wt. %; and the polymerizable monomeric system is present in an amount of about 7 to about 30 wt. %, preferably about 15 wt. %, based upon the weight of the cement. Upon curing, the cement paste composition maintains a strength of at least about 2000 psi at room temperature after heat treatment at about 3000° C. even when cured at a substantially lower temperature.

Typically, the carbonaceous cement composition is used along with a precoat. The pre-coat comprises a liquid consisting of the monomeric system in a furan solvent mixed to a uniform consistency in a Hobart-type mixer to which is added a catalyst. Preferably, the furan solvent comprises furfuryl alcohol. Preferably, the monomeric system comprises about 15 to about 35 wt. % of a dialkyl ester of an aromatic tetracarboxylic acid, an aromatic diamine, and a monoalkyl ester of an acid selected from the group consisting of 5-norbornene-2,3-dicarboxylic acid and phthalic acid. The alkyl chains of the esters range from C1 (methyl) to C5 (pentyl). Most preferably, the pre-coat comprises about 27 wt. %, of a monomeric system comprising a dimethyl ester of 3,3',4,4'-benzophenonetetracarboxylic acid, 2,2'-bis (4-[4-aminophenoxyl]phenyl)propane and a monomethyl ester of 5-norbornene-2,3-dicarboxylic acid dissolved in about 65 to about 85 wt. % furfuryl alcohol. A catalyst solution comprising about 50 wt. % aqueous zinc chloride solution is added dropwise to the above during mixing. Mixing continues until the liquid components are thoroughly dispersed. The pre-coat and cement are preferably stored separately at about 5° C.

When using the adhesive system for attaching together carbon bodies, for example graphite bodies, the surfaces at the attachment sites are first machined to a fine finish to form a close fit. The surfaces are prepared for bonding by machining to a finish of at least about 63 MIF (micro-inch finish) or preferably as smooth as about 32 MIF. The carbon bodies are then dried if necessary and any dust from machining is removed, e.g., by vacuuming. The pre-coat is applied to the surface of the attachment sites with any conventional method such as a brush or roller until a puddle remains and the site is substantially saturated with the pre-coat. Typically, five or six applications of the pre-coat may be necessary during an application period. The multiple applications allow the pores of the carbon bodies to be saturated with the pre-coat. Excess precoat is removed from the surface.

The carbonaceous cement is then typically applied with a trowel to the surface of the attachment site. After the surfaces are coated with the cement, the surfaces are aligned and joined together. After joining, it is preferable to slide, back and forth, one or both of the surfaces along the plane of the joint to reduce the thickness of the cement layer between the joined surfaces. The sliding of the surfaces are such that the layer of cement between the surfaces becomes sufficiently thin that its lubricating action is lost. Preferably, the joint thickness should be less than about 0.013 cm, and most preferably, less than about 0.003 to about 0.005 cm. The fineness of the coke flour and carbon black effectively allows for such a thin joint.

It has been unexpectedly found that the particle size of the carbon filler is important for a thin joint thickness when using the cement paste composition to attach carbon bodies. A thin joint is less prone to thermal stress and oxidation during service of large carbon bodies. It is also capable of sustaining repeated thermal cycling during service such that the cemented joints remain intact, particularly, at high temperatures.

The joined carbon bodies are clamped together using any conventional method such as weights, clamps, hydraulic presses and the like, preferably, at a pressure of typically about 2 to about 50 psi depending on the size of the bodies to be cemented. The joined carbon bodies are preferably cured by heating the joined bodies at an elevated temperature of at least about 200° C. Alternatively, the joined carbon bodies are rapidly heated to about 60 to about 100° C. and held for about 4 to about 6 hours followed by heating to about 240 to about 275° C. at a rate of about 10 to about 15° C./hour. The joined carbon bodies are held for about 2 to about 6 hours at this elevated temperature. Once cured, the external surfaces of the joined carbon bodies are machined to provide a smooth overall finish.

The present invention achieves the objects recited above. The carbonaceous cement of the present invention utilizing a monomeric binder phase comprising a dialkyl ester of an aromatic tetracarboxylic acid, an aromatic diamine, and a monoalkyl ester of an acid selected from the group consisting of 5-norbornene-2,3-dicarboxylic acid and phthalic acid is capable of substantially gelling after curing at about 240° C. and once cured does not re-soften at high service temperatures. Subsequent heating of the monomeric binder causes further cross-linking producing a stronger and more stable cement for use at service temperatures greater than the initial glass transition temperature of the cured cement.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A curable cement paste composition comprising:
   a catalyst;
   a carbon filler present in an amount of about 20 to about 60 wt. %;

a polymerizable monomeric system present in an amount of about 7 to about 30 wt. % comprising a dialkyl ester of an aromatic tetracarboxylic acid, an aromatic diamine, and a monoalkyl ester of an acid selected from the group consisting of 5-norbornene-2,3-dicarboxylic acid and phthalic acid; and a furan derivative solvent present in an amount of about 20 to about 60 wt. %.

2. The cement paste composition of claim 1 wherein said catalyst comprises a heat activated aqueous solution of zinc chloride, and wherein said furan derivative solvent comprises furfuryl alcohol.

3. The cement paste composition of claim 1 wherein said carbon filler comprises carbon black, pitch coke flour, petroleum coke flour or mixtures thereof.

4. The cement paste composition of claim 1 wherein said carbon filler comprises carbonaceous particles wherein at least about 90% of said particles have a particle size less than about 20 $\mu$m.

5. The cement paste composition of claim 1 wherein said dialkyl ester of an aromatic tetracarboxylic acid comprises a dimethylester of 3,3',4,4'-benzophenonetetracarboxylic acid.

6. The cement paste composition of claim 1 wherein said aromatic diamine is selected from the group consisting of 4,4'-methylenedianiline, 4,4'-oxydianiline, p-phenylenediamine, 2,2'-bis(4-[4-aminophenoxyl]phenyl)propane, and 3,5-diaminobenzotrifluoride.

7. The cement paste composition of claim 1 wherein said monoalkyl ester comprises a monomethyl ester of 5-norbornene-2,3-dicarboxylic acid.

8. The cement paste composition of claim 1 wherein said composition upon curing maintains a strength of at least about 2000 psi at room temperature after heat treatment at about 3000° C. even when cured at a substantially lower temperature.

9. The cement paste composition of claim 1 wherein said cement paste is curable at a temperature of at least about 200° C.

10. A curable cement paste composition comprising:
   a catalyst in an effective amount;
   a carbon filler present in an amount of about 40 wt. %;
   a polymerizable monomeric system present in an amount of about 15 wt. % comprising a dialkyl ester of an aromatic tetracarboxylic acid, an aromatic diamine, and a monoalkyl ester of an acid selected from the group consisting of 5-norbornene-2,3-dicarboxylic acid and phthalic acid; and
   a furan derivative solvent present in an amount of about 40 wt. %.

11. A carbonaceous bonding composition comprising
   an effective amount of furfuryl alcohol of about 40 wt. %;
   a carbon filler comprising about 40 wt. % pitch coke flour, petroleum coke flour, carbon black or mixtures thereof;
   a polymerizable monomeric binder comprising about 15 wt. % of a dimethylester of 3,3',4,4'-benzophenonetetracarboxylic acid, 2,2'-bis(4-[4-aminophenoxyl]phenyl)propane and a monomethyl ester of 5-norbornene2,3-dicarboxylic acid, said monomeric binder dissolved in an effective amount of furfuryl alcohol and admixed with said carbon filler to a uniform consistency; and
   a catalytic solution comprising an effective amount of 50 wt. % aqueous solution of zinc chloride admixed with furfuryl alcohol, said catalytic solution added to said monomeric binder and said carbon filler, wherein the carbonaceous bonding composition is curable at a temperature of at least about 200° C., produces a carbon yield of about 70% at about 900° C. and maintains a strength of at least about 2000 psi at room temperature after heat treatment at about 3000° C. even when cured at a substantially lower temperature.

12. A carbonaceous cement composition made by admixing the following materials:
   a catalyst;
   a furan derivative solvent in an amount of about 20 to about 60 wt. %;
   a carbon filler in an amount of about 20 to about 60 wt. %; and
   a polymerizable monomeric binder in an amount of about 7 to about 30 wt. % comprising a dialkyl ester of an aromatic tetracarboxylic acid, an aromatic diamine, and a monoalkyl ester of an acid selected from the group consisting of 5-norbornene-2,3-dicarboxylic acid and phthalic acid; and
curing the admixture at a temperature of at least about 200° C.

13. A method of bonding carbon bodies comprising:
   (a) providing two or more carbon bodies to be bonded together;
   (b) coating said carbon bodies with a pre-coat at a bonding site until said bonding site is substantially saturated with said pre-coat, said pre-coat comprising
      a furan derivative solvent present in an amount of about 65 to about 85 wt. %,
      a polymerizable monomeric system present in an amount of about 15 to about 35 wt. % comprising a dialkyl ester of an aromatic tetracarboxylic acid, an aromatic diamine, and a monoalkyl ester of an acid selected from the group consisting of 5-norbornene-2,3-dicarboxylic acid and phthalic acid, said monomeric system dissolved in an effective amount of said furan derivative solvent, and
      a catalyst, said catalyst added to said polymerizable monomeric system dissolved in an effective amount of said furan derivative solvent;
   (c) applying an effective amount of a carbonaceous cement composition to said bonding site, said carbonaceous cement composition comprising:
      a furan derivative solvent in an amount of about 20 to about 60 wt. %;
      a catalyst admixed with a first effective amount of said furan derivative solvent;
      carbonaceous particles in an amount of about 20 to about 60 wt. %; and
      a polymerizable monomeric binder in an amount of about 7 to about 30 wt. % comprising a dialkyl ester of an aromatic tetracarboxylic acid, an aromatic diamine, and a monoalkyl ester of an acid selected from the group consisting of 5-norbornene-2,3-dicarboxylic acid and phthalic acid, said monomeric binder dissolved in a second effective amount of said furan derivative solvent and admixed with said carbonaceous particles and said catalyst to form said cement composition;
   (d) setting said carbon bodies together at the bonding site forming a joined carbon body; and
   (e) heating said joined carbon body.

14. The method of claim 13 in step (b) wherein said pre-coat comprises a monomeric system present in an amount of about 27 wt. % comprising a dimethylester of 3,3',4,4'-benzophenonetetracarboxylic acid, 2,2'-bis(4-[4- aminophenoxyl]phenyl)propane and a monomethyl ester of 5-norbornene-2,3-dicarboxylic acid dissolved in an effective amount of furfuryl alcohol to which is added a 50 wt. % aqueous zinc chloride solution.

15. The method of claim 13 in step (c) wherein said carbonaceous cement composition comprises
an effective amount of furfuryl alcohol present in an amount of about 40 wt. %;
a catalyst comprising an aqueous solution of zinc chloride admixed with a first effective amount of furfuryl alcohol;
carbonaceous particles present in an amount of about 40 wt. % comprising petroleum coke flour, pitch coke flour, carbon or mixtures thereof;
a polymerizable monomeric binder present in an amount of about 15 wt. % comprising a dimethylester of 3,3',4,4'-benzophenonetetracarboxylic acid, 2,2'-bis(4-[4-aminophenoxyl]phenyl)propane and a monomethyl ester of 5-norbornene-2,3-dicarboxylic acid dissolved in an effective amount of furfuryl alcohol, said polymerizable monomeric binder admixed with said carbonaceous particles to a uniform consistency;
wherein the carbonaceous bonding composition is curable at a temperature of at least about 200° C., produces a carbon yield of about 70% at about 900° C. and maintains a strength of at least about 2000 psi at room temperature after heat treatment at about 3000° C. even when cured at a substantially lower temperature.

16. The method of claim 13 wherein step (e) comprises heating said joined carbon body for a time a temperature to substantially cure said carbonaceous bonding composition.

17. A high temperature adhesive system comprising:
a pre-coat for substantially saturating a carbon body at a bonding site, said pre-coat comprising:
a first portion of a furan derivative solvent present in an amount of about 65 to about 85 wt. %,
a polymerizable monomeric system present in an amount of about 15 to about 35 wt. % comprising a dialkyl ester of an aromatic tetracarboxylic acid, an aromatic diamine, a monoalkyl ester of an acid selected from the group consisting of 5-norbornene-2,3-dicarboxylic acid and phthalic acid, said monomeric system dissolved in an effective amount of said first portion of a furan derivative solvent, and
a catalyst added to said polymerizable monomeric system dissolved in an effective amount of said first portion of a furan derivative solvent; and
a carbonaceous cement composition for applying to the carbon body at the bonding site over said pre-coat, said carbonaceous cement composition comprising:
a second portion of a furan derivative solvent present in an amount of about 20 to about 60 wt. %;
a catalyst admixed with a first effective amount of said second portion of a furan derivative solvent;
carbonaceous particles present in an amount of about 20 to about 60 wt. %; and
a polymerizable monomeric system present in an amount of about 7 to about 30 wt. % comprising a dialkyl ester of an aromatic tetracarboxylic acid, an aromatic diamine, and a monoalkyl ester of an acid selected from the group consisting of 5-norbornene-2,3-dicarboxylic acid and phthalic acid, said monomeric system dissolved in a second effective amount of said second portion of a furan derivative solvent and admixed with said carbonaceous particles and said catalyst to form said cement composition.

18. The system of claim 17 wherein the monomeric system of said pre-coat comprises a dimethylester of 3,3',4,4'-benzophenonetetracarboxylic acid, 2,2'-bis(4-[4-aminophenoxyl]phenyl)propane and a monomethyl ester of 5-norbornene2,3-dicarboxylic acid dissolved in furfuryl alcohol and wherein said catalyst comprises a 50% aqueous zinc chloride solution.

19. The system of claim 17 wherein the furan soluble, polymerizable monomeric system of said carbonaceous cement composition comprises a dimethylester of 3,3',4,4'-benzophenonetetracarboxylic acid, 2,2'-bis(4-[4-aminophenoxyl]phenyl)propane and a monomethyl ester of 5-norbornene-2,3-dicarboxylic acid, said monomeric system dissolved in an effective amount of furfuryl alcohol.

20. The cement paste composition of claim 10 wherein said carbon filler comprises carbonaceous particles wherein at least about 90% of said particles have a particle size less than about 20 $\mu$m.

21. The carbonaceous bonding composition of claim 11 wherein said carbon filler comprises carbonaceous particles wherein at least about 90% of said particles have a particle size less than about 20 $\mu$m.

22. The carbonaceous cement composition of claim 12 wherein said carbon filler comprises carbonaceous particles wherein at least about 90% of said particles have a particle size less than about 20 $\mu$m.

23. The method of claim 13 wherein at least about 90% of said carbonaceous particles have a particle size less than about 20 $\mu$m.

24. The high temperature adhesive system of claim 17 wherein at least about 90% of said carbonaceous particles have a particle size less than about 20 $\mu$m.

* * * * *